United States Patent [19]

Lucht

[11] Patent Number: 5,878,280

[45] Date of Patent: *Mar. 2, 1999

[54] DATA BUFFERING SYSTEM FOR PLURAL DATA MEMORY ARRAYS

[75] Inventor: Philip Harrison Lucht, Salt Lake City, Utah

[73] Assignee: Philips Electronics North America Corp., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 752,864

[22] Filed: Nov. 20, 1996

Related U.S. Application Data

[63] Continuation-in-part of Ser. No. 389,672, Feb. 16, 1995, Pat. No. 5,671,386, which is a continuation-in-part of Ser. No. 125,996, Sep. 23, 1993, Pat. No. 5,539,660.

[51] Int. Cl.$^6$ ..................................................... G06F 15/02
[52] U.S. Cl. ............................................................. 395/872
[58] Field of Search ...................................... 395/872, 854, 395/857, 825, 894, 855, 876, 290, 182.03, 182.04

[56] References Cited

U.S. PATENT DOCUMENTS

| | | | |
|---|---|---|---|
| 3,893,088 | 7/1975 | Bell | 365/78 |
| 4,421,965 | 12/1983 | Gentric et al. | 200/175 |
| 4,949,171 | 8/1990 | Grandmougin | 358/93 |
| 4,949,187 | 8/1990 | Cohen | 358/335 |
| 5,038,277 | 8/1991 | Altman et al. | 395/250 |
| 5,163,131 | 11/1992 | Row et al. | 395/200.32 |
| 5,179,552 | 1/1993 | Chao | 370/60 |
| 5,185,876 | 2/1993 | Nguyen et al. | 395/841 |
| 5,206,943 | 4/1993 | Callison et al. | 711/114 |
| 5,237,658 | 8/1993 | Walker et al. | 395/858 |
| 5,311,423 | 5/1994 | Clark | 364/401 |
| 5,341,258 | 8/1994 | Chalmers et al. | 360/92 |
| 5,341,474 | 8/1994 | Gelman et al. | 395/200.36 |
| 5,355,453 | 10/1994 | Row et al. | 395/200.49 |
| 5,371,532 | 12/1994 | Gelman et al. | 348/7 |
| 5,392,244 | 2/1995 | Jacobson et al. | 395/441 |
| 5,414,816 | 5/1995 | Oyadomari | 395/880 |
| 5,440,336 | 8/1995 | Buthro et al. | 348/13 |
| 5,442,390 | 8/1995 | Hooper et al. | 348/7 |
| 5,469,548 | 11/1995 | Callison et al. | 711/114 |
| 5,471,640 | 11/1995 | McBride | 395/842 |
| 5,539,660 | 7/1996 | Blair et al. | 348/7 |
| 5,544,339 | 8/1996 | Baba | 395/441 |

OTHER PUBLICATIONS

Sakamoto et al., "Multimedia integrated switching architecture for visual information retrieval systems", SPIE, vol. 1908, pp. 123–132.

*Primary Examiner*—Dung C. Dinh
*Attorney, Agent, or Firm*—Michael E. Belk

[57] ABSTRACT

A video server includes a plurality of input/output devices coupled to a plurality of memory arrays via a commutator. Within each memory array, a buffer is operative to collect data for transfer to and/or from an array controller. Each memory array includes an error correction system providing parity-based RAID type error correction. A plurality of disk controllers each having a FIFO buffer and respective pluralities of disk memories are commonly coupled to a communication bus which in turn is coupled to the error correction system by a FIFO buffer. A segment buffer having a plurality of low cost memory devices which are configured to provide a plurality of ring buffers is coupled to the data bus. An access logic circuit controls the data flow through the FIFO buffer and a central processing unit is operative to provide address sequence upon the communication bus for controlling data transfer to and from the segment buffer. An arbitrator is operative to resolve contentions between the FIFO buffer, the central processing unit, and the disk controllers for access to the segment buffer. The arbitrator utilizes an overall contention resolution priority which includes a rotating subpriority for resolving contentions among the plural disk controllers.

11 Claims, 3 Drawing Sheets

DATA BUFFERING SYSTEM FOR PLURAL DATA MEMORY ARRAYS

CROSS-REFERENCE TO RELATED PATENT APPLICATION

This application is a continuation-in-part of copending application Ser. No. 08/389,672, filed Feb. 16, 1995, U.S. Pat. No. 5,671,386, which is a continuation-in-part of application Ser. No. 08/125,996, filed Sep. 23, 1993, now issued as U.S. Pat. No. 5,539,660, both of which are in the name of Blair, Curtis and Lucht, assigned to the assignee of the present application and incorporated herein by reference.

BACKGROUND OF THE INVENTION

1. Field of the Invention

This invention relates generally to multi-user information systems and particularly to systems having mass information storage media formed of one or more arrays of individual memory units such as disk drives which service real time applications such as video on demand.

2. Description of the Related Art

The rapid advances in information system technologies have facilitated great improvement in the distribution of information and entertainment material. Such distribution has been aided by the development and rapid increase of information networks such as those provided by cable television systems or the like. One of the most promising information system developments in the entertainment industry is the availability of so-called "video on demand" for television viewers. The basic concept of video on demand is relatively simple and clearly attractive to consumers. The basic idea of video on demand provides that individual consumers or viewers are able to independently access the stored data source of a plurality of stored entertainment programs such as movies or the like. This independent access frees the individual consumers from the restrictive nature of scheduled network distribution of present day cable systems. Thus, the viewer in a video on demand system is able to simply "dial up" the media storage and distribution facility through the cable network and view the desired program at any time.

While the basic concept of video on demand is simple, its implementation in a practical environment is extremely difficult and complex. In essence, the system must be capable of providing each viewer with independent access to the stored entertainment material. In a typical cable system environment, thousands and perhaps tens of thousands of viewers are serviced. To provide each with independent access to the plurality of program materials within the massive media inventory is a daunting task. To further exacerbate the problem, the nature of entertainment material, namely video and audio information, represents a large amount of information to be communicated. Thus, an effective video on demand system requires that an immense quantity of program information be stored within the mass media and a great number of subscribers be able to access the stored mass media simultaneously or nearly simultaneously.

The need for high volume, high speed access to large media storage systems is not, however, unique to video on demand operations. In related uses of such information systems such as interactive video, the rapid storage and retrieval of data and/or information from the mass media is necessary. In addition, other such systems are applicable to interactive television and television broadcasting operations. Further movie industry uses such as special effects production and post-production processes also require rapid storage and/or retrieval of large amounts of data.

Powerful computing systems also require high speed access to large data storage systems. Despite their similar need for high speed, high bandwidth access to large media storage systems, video on demand systems and video servers operate in a substantially more demanding and difficult environment than other computing systems. Video servers must provide simultaneous access to a large number of viewers or users. In addition, this access must be rapid and provide speed and continuity approaching real-time access and real-time data flow. Unlike computer systems which are able to wait for data, video on demand and video servers "crash" if data is not timely available. In other words, video servers must provide predictable or, so-called, "deterministic" bandwidths within each data channel. The provision of this deterministic bandwidth within video servers and the continuous supply of timely data is a crucial element of system performance.

In attempting to provide the necessary bandwidth, information storage and information retrieval at high speed to multiple users, practitioners in the video server arts have resorted to ever faster processors and parallel processing with somewhat limited success. However, faster processors and parallel processing alone have not provided a complete solution to the specialized problems of video servers. Certain limitations in system performance arise out of the characteristics of memory devices themselves.

Most, if not all, systems requiring storage and retrieval of large amounts of data, utilize one or more randomly accessible memory devices such as disk drive memories. Disk drives are highly effective in such applications due to the speed with which they operate and substantial storage capacity which they exhibit. Thus, disk drives provide random access, substantial capacity and relatively rapid storage or retrieval of information. Typically, to provide greater memory, disk drives are arranged in large arrays which operate under the coordination and interface of one or more so-called disk controllers. As good as such disk arrays and disk controllers are, their operating characteristics do impose limitations on system performance.

System response speed and ability to maintain continuous, reliable and deterministic channel bandwidths is determined, in part, by the speed with which the system disk drives themselves operate.

Basically, to retrieve data, the disk drive must first locate it. Thus, a time interval is required for the disk drive head to locate the particular portion of the disk upon which data is stored. This process essentially involves moving the disk drive head to the appropriate disk radius (usually called "seek") and thereafter rotating the disk until the desired disk portion is proximate to the drive head (usually called "latency"). The actual time of this interval is a characteristic of the particular disk drive fabrication and varies between disk drive designs. However, all disk drives exhibit a data location time interval characteristic. This data location time interval represents "lost time" in systems such as video servers in that no data is retrieved or stored during this interval. The overall effect of such lost time is cumulative and directly reduces system bandwidth and speed.

There remains therefore a continuing need in the art for improved video server systems which maintain continuous, reliable and deterministic channel bandwidths while using plural arrays of disk memories and disk controllers as for data storage. There remains a further need for improved video server systems which reduce the effect of disk drive data location time on system bandwidths.

SUMMARY OF THE INVENTION

Accordingly, it is a general object of the present invention to provide an improved video server system which maintains continuous, reliable and deterministic channel bandwidths while using plural arrays of disk memories and disk controllers for data storage. It is a more particular object of the present invention to provide an improved data buffering system within a video server which minimizes the reduction of bandwidth caused by disk drive data location time.

The present invention provides a structure and method by which the overall efficiency and effectiveness of a video server can be improved using data transfers to or from the array of disk drives which are carried forward in the form of long duration data segments while data flow in the remainder of the system is carried forward using short duration data bursts. The data segment size selected is large relative to the data location intervals of the disk drive to minimize the loss of efficiency which would otherwise result. To maintain the effective short duration data burst transfers within the remainder of the system while using such large data segment transfers to or from the disk drives, a plurality of segment buffers (one per data channel) are provided.

Thus, the present invention provides a system operative within a server having plural input/output devices and plural memory arrays for use in storing and/or retrieving large amounts of data to and/or from the memory arrays to maintain a plurality of substantially continuous data streams. That system comprises: (a) a buffer unit for buffering data received in the form of short duration data bursts to form long duration data segments therefrom which are substantially longer than the short duration data bursts, and for buffering data received in the long duration data segments to obtain short duration data bursts therefrom; (b) a first transfer unit for transferring data between the memory arrays and the buffer unit solely in the form of long duration data segments; and (c) a second transfer unit for transferring data between the input/output devices and the buffer unit for buffering solely in the form of short duration data bursts.

More specifically, the present invention provides a system for use in storing and/or retrieving large amounts of data to maintain a plurality of substantially continuous data streams, in which the system comprises: (a) a plurality of input/output devices, each having a plurality of input/output data channels; (b) a plurality of array controllers, each having a plurality of disk controller data channels; (c) a plurality of buffer memories providing a buffer memory for each of the disk controller data channels for receiving data from the input/output devices in the form of short duration data bursts and accumulating the short duration data bursts to form data segments substantially larger than the data bursts and providing the data segments to the arrays controllers, and for receiving data from the array controllers in the form of data segments and providing such data to the input/output devices in the form of short duration data bursts; (d) a coupling unit for coupling data between the input/output devices and the plurality of buffer memories in the form of short duration data bursts; (e) a plurality of disk arrays, coupled to the array controllers, each having a plurality of disk memories; and (f) a transfer unit cooperating with the array controllers to transfer data to and/or from the disk arrays in the form of data segments.

In carrying forward the present invention, there is provided a method for use in storing and/or retrieving large amounts of data to maintain a plurality of substantially continuous data streams. That method comprises: (a) transferring data to and/or from a plurality of input/output data channels in the form of short duration data bursts; (b) transferring data to and/or from a plurality of disk memories in the form of data segments substantially larger in duration than the short duration data bursts; (c) segment buffering data transferred from the input/output data channels to the disk memories to accumulate the short duration data bursts into the data segments; and (d) segment buffering data transferred from the disk memories to the input/output channels to reformat data segments into short duration data bursts.

BRIEF DESCRIPTION OF THE DRAWINGS

The invention, together with further objects and advantages thereof, may best be understood by reference to the following description taken in conjunction with the accompanying drawings, in which.

DESCRIPTION OF THE PREFERRED EMBODIMENT

Figure 1:
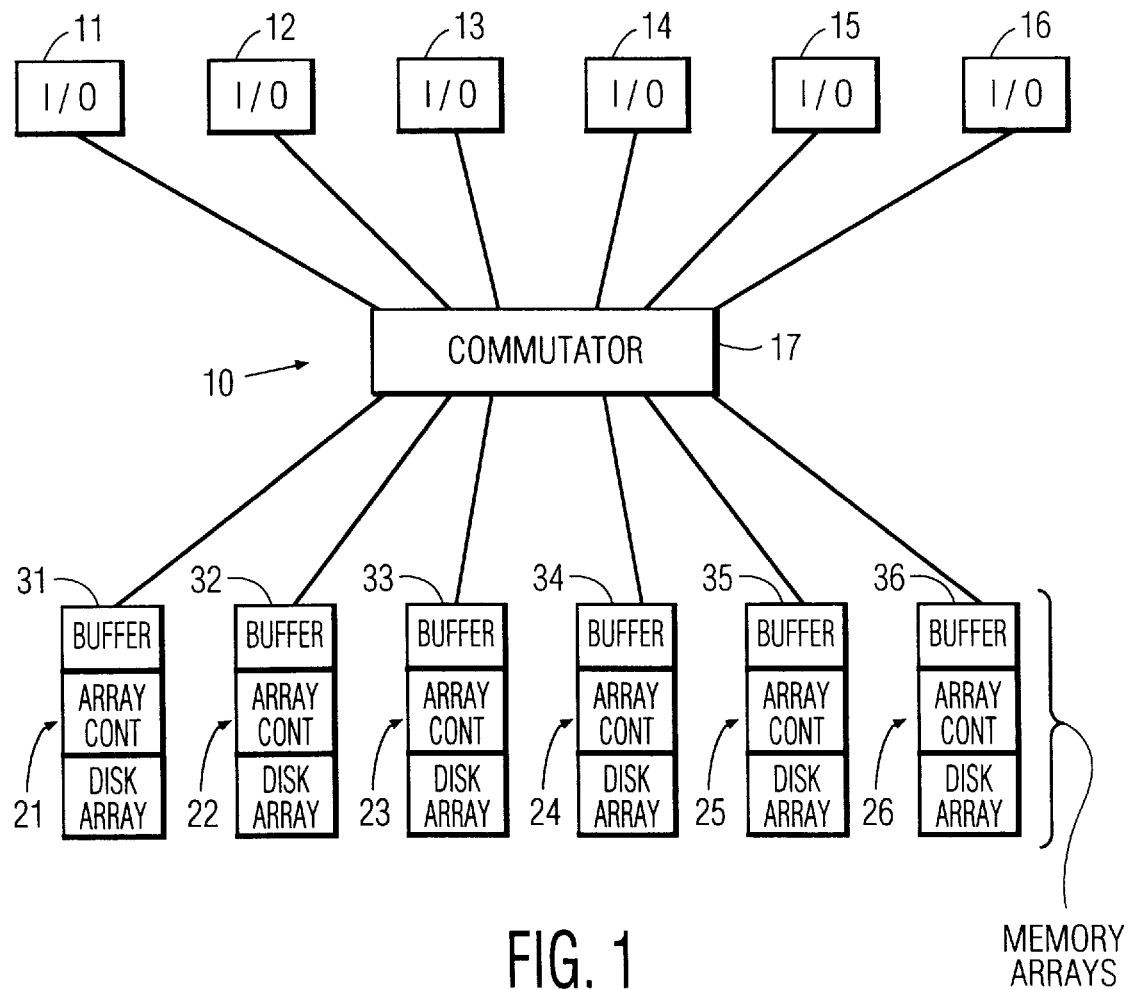
FIG. 1 sets forth a block diagram of a video server system utilizing a data buffering system constructed in accordance with the present invention.

FIG. 1 sets forth a block diagram of a video server utilizing the present invention data buffering system and generally referenced by numeral 10. Video server 10 includes a plurality of input/output devices 11 through 16 coupled to a commutator 17. Commutator 17 is further coupled to a plurality of memory arrays 21 through 26. Each of memory arrays 21 through 26 includes a respective array controller operatively coupled to a plurality of disk memories forming a disk array. In addition and in accordance with the present invention, each of memory arrays 21 through 26 includes a respective data buffering system 31 through 36, described below in greater detail.

In operation, input/output devices 11 through 16 provide interfaces to a plurality of user channels (not shown). In accordance with the operation of commutator 17 set forth in the above-referenced copending application in greater detail, commutator 17 couples each of input/output devices 11 through 16 to memory arrays 21 through 26 in a repetitive sequence. This repetitive sequential coupling is carried forward in a "rotating" pattern such that, at any given time, each input/output device is operatively coupled to one of the memory arrays. This commutating pattern is employed for both data storage and retrieval. Data within each input/output device is organized into a plurality of data channels carrying data such as video, audio or time code information.

Thus, for example, when data is to be stored within memory arrays 21 through 26, the data received at input/output devices 11 through 16 and is formatted into uniform sized short bursts. The short bursts are sequentially transferred to memory arrays 21 through 26 through the data striping action of commutator 17. This data striping process is described fully in the above-described related application. Suffice it to note here, however, that short bursts are sequentially transferred to each of memory arrays 21 through 26 in a repeated striping pattern which provides a generally uniform data distribution among the memory arrays. As data is striped across the memory arrays, the short bursts are accumulated into data segments, the respective buffering systems 31 through 36 within memory arrays 21 through 26 temporarily store the data segments for each data channel and, in accordance with the operation described below in greater detail, thereafter facilitate the storage of the data segments within each respective disk array.

Data retrieval operations of video server 10 are carried forward in a process which is, in essence, the reverse process of data storage. That is to say, each array controller within memory arrays 21 through 26 retrieves data segments from its respective disk array and the retrieved data segments are temporarily stored within buffers 31 through 36. The buffered data is formed into short bursts and then transferred to input/output devices 11 through 16 via commutator 17.

In accordance with the operation of data buffering systems 31 through 36 set forth below in greater detail, the present invention buffering system provides a large number of low cost DRAM memory devices operating under address logic control. To enhance system speed and bandwidth, the address logic control utilizes the plurality of DRAM memory devices in a technique known as fast page mode operation. This mode of operation is characterized by organizing the DRAM devices in a row and column address format and operating the address logic control such that system speed is enhanced by reading or writing data in a succession of addresses within the same row. The address logic control also provides flexible programmable addressing suited to the complex scheme of data striping and RAID type error correction. Data is processed within the system in the form of short duration data bursts which are accumulated within the data buffers of each data channel to form larger data segments.

Each buffer system includes an arbitrator for handling simultaneous memory access demands. The arbitrator utilizes a rotating priority scheme which is described below in FIG. 4. An important aspect of the rotating priority scheme is the maintenance of sufficient data flow within the disk array to avoid interruption of data flow within the array controllers. The use of small data segments divided into still smaller data bursts to achieve the approximation of continuous data flow is enhanced in the preferred operation of the present invention system by utilizing a multiple segment ring buffer configuration within each data channel. The latter facilitates the writing of data to one portion of a channel ring buffer while simultaneously reading previously written data from another portion of the channel ring buffer and, at the conclusion of a read/write cycle, "rotating" the ring buffer. As is described below in greater detail, the resulting buffering system provides a large capacity buffer operable at high data rates and high bandwidths which closely approximates a large multiport memory without its attendant high cost. The complex addressing scheme of the host system needed for data striping and RAID type error correction is accommodated by the address control logic while facilitating the use of low cost DRAM devices.

Figure 2:
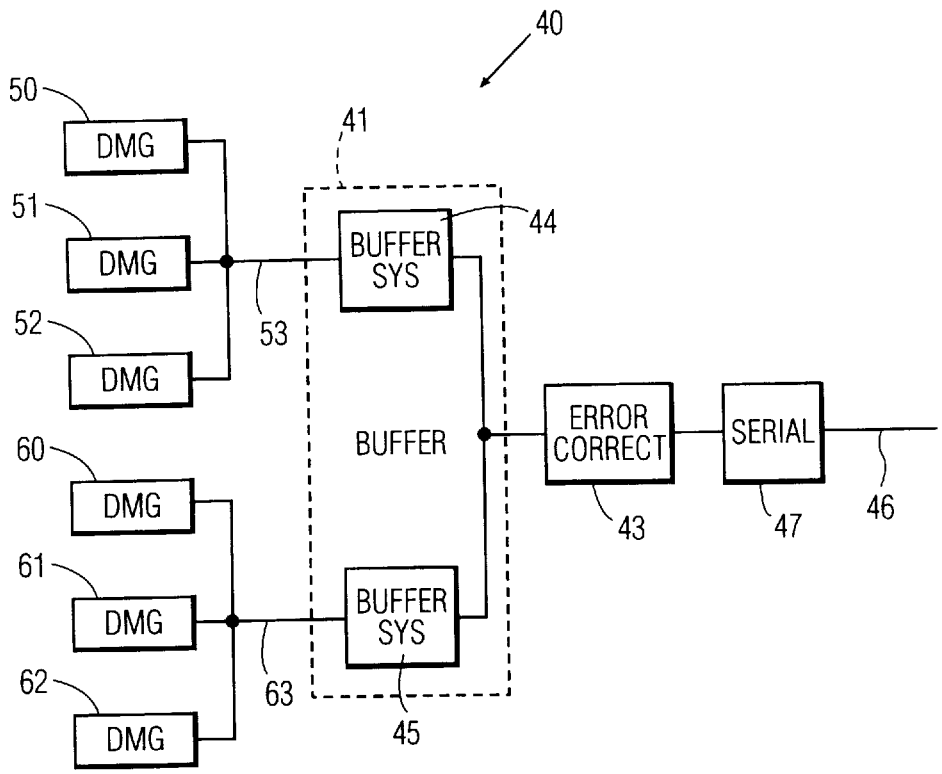
FIG. 2 sets forth a block diagram of an exemplary buffer system, array controller, and memory array constructed in accordance with the present invention.

FIG. 2 sets forth a block diagram of an exemplary memory array constructed in accordance with the present invention and generally referenced by numeral 40. Memory array 40 is illustrative of memory arrays 21 through 26 shown in FIG. 1. Thus, the discussions which follow related to memory array 40 should be understood to apply equally well to memory arrays 21 is through 26 shown in FIG. 1.

More specifically, memory array 40 includes a buffer 41, shown in dashed outline, which includes a pair of buffer systems 44 and 45, the structures of which are set forth below in FIG. 3 in greater detail. Buffer systems 44 and 45 are coupled to busses 53 and 63 and are also commonly coupled to a RAID-type error correction system 43. A serializer 47, which operates to convert serial data to parallel data and vice-versa, is coupled to error correction system 43. A plurality of disk memory groups 50, 51, 52, 60, 61 and 62 each include a plurality of disk memories and a disk controller each of which is configured in the manner described below in FIG. 3. Disk memory groups (DMG) 50, 51 and 52 are commonly coupled to a buffer system 44 while disk memory groups (DMG) 60, 61 and 62 are commonly coupled to a buffer system 45. This arrangement divides the data buffering load within buffer 41. It will be recognized however that all six disk memory groups may be coupled to a single larger buffer in place of buffer systems 44 and 45 without departing from the present invention.

The basic function of the disk memory groups shown in FIG. 2 is to store and retrieve data and to provide for the effective transfer of data to and from buffer systems 44 and 45 via communication busses 53 and 63 respectively. Buffer systems 44 and 45 are set forth below in FIG. 3 in greater detail. However, suffice it to note here that as mentioned above, each buffer system is organized as a multiple segment ring buffer operative to provide behavior characteristics corresponding to high bandwidth, multiported random access memory devices.

During a record operation, data is stored within the disk memories of groups 50 through 52 and 60 through 62. A high speed serial data stream from commutator 17 (seen in FIG. 1) is converted to parallel data by serializer 47 which in turn is coupled to error correction system 43. Within error correction system 43, a RAID type parity based error correction function such as RAID-3 error correction is performed. This operation involves combining the data for each active disk within the memory group using an exclusive-or calculation to provide parity data which together with the remaining data is applied to buffer systems 44 and 45. As mentioned above, buffer systems 44 and 45 are configured to provide multiple segment buffering for each data channel utilizing a plurality of ring buffer arrangements which facilitate writing data into one segment of the ring buffer while simultaneously reading previously written data out from another segment of the ring buffer. Thus, within each of the channel ring buffers within buffer systems 44 and 45, new data in the form of short duration data bursts is being simultaneously written to one ring buffer segment and previously written data is being read from another ring buffer segment in a substantially continuous process.

During the writing of data into the ring buffers of buffer systems 44 and 45, data bursts are accumulated within each ring buffer segment until a predetermined uniform data segment has been accumulated. The size of the data segment utilized is, to some extent, a matter of design choice. In essence, however, the data segment size is selected to provide a sufficiently large amount of data relative to the seek and latency characteristics of the system disk drives and thereby optimize overall system efficiency.

Within each of disk memory groups 50 through 52 and 60 through 62, a plurality of active disk drives together with a parity data disk drive are controlled by a disk controller which operates to transfer data to and from the disk drives using conventional communication busses. These transfers are provided via communication busses 53 and 63. As mentioned above, data stored within the system disk drives is striped or "sprayed" across the disk drive groups in a generally uniform distribution of data.

During playback operation, data is retrieved from the disk memory groups, buffered, error corrected and converted to serial data which is outputted to commutator 17 to form a serial data stream upon high speed transmission line 46. More specifically, data is retrieved or read from the disk memories by their respective disk controllers. The retrieved data, in the form of long data segments, is then applied to buffer systems 44 and 45 via communication busses 53 and 63 respectively. Within buffer systems 44 and 45, the long data segments are divided to form short duration bursts which are ultimately transferred to communication line 46 through error correction 43 and serializer 47. During the transfer of data to and from buffer systems 44 and 45, the above-described multiple segment ring buffering process within each data channel is carried forward as data segments are simultaneously written to and read from the ring buffers in the same manner described above during the record process.

Figure 3:
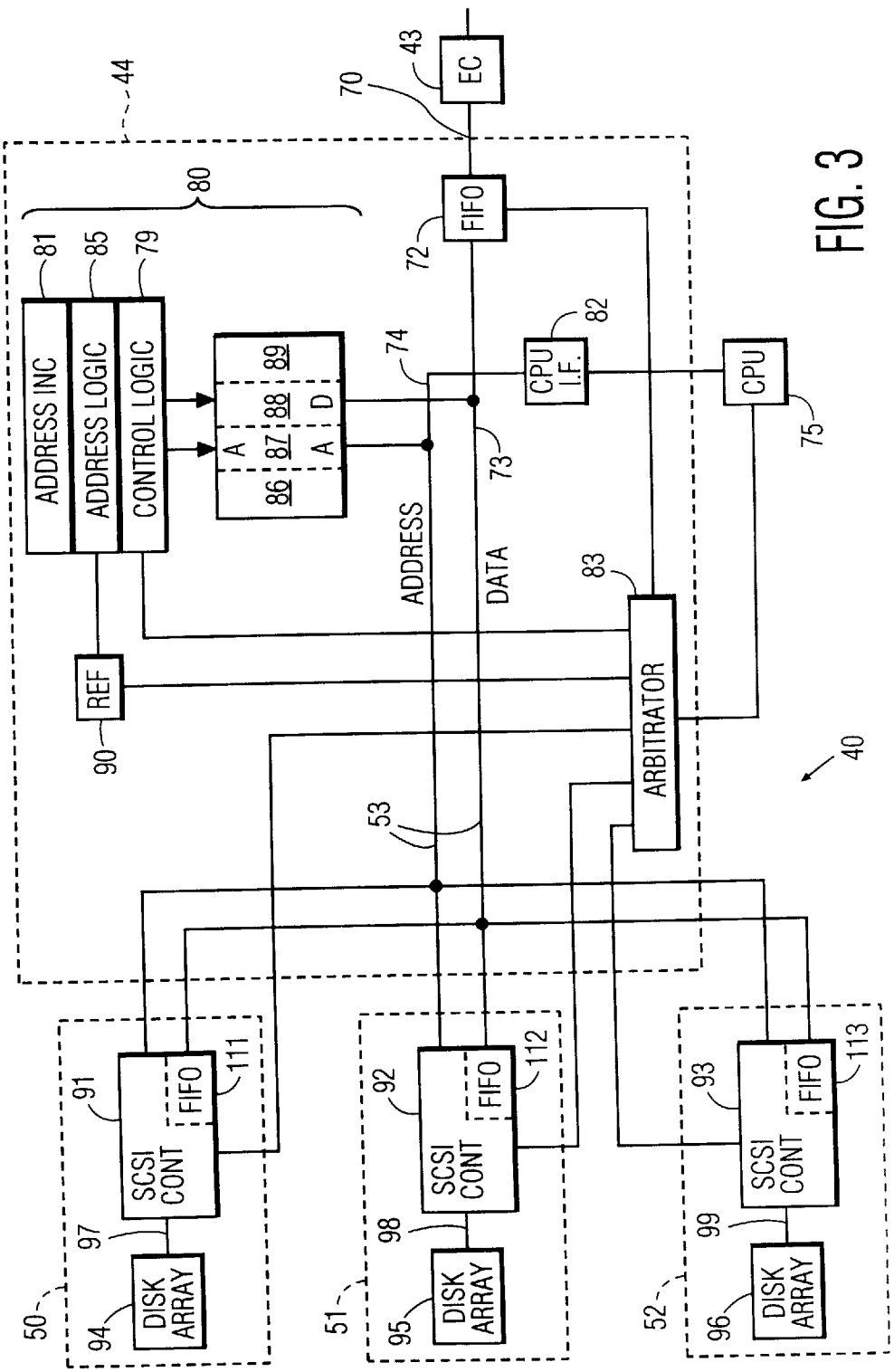
FIG. 3 sets forth a block diagram of the present invention data buffering system.

FIG. 3 sets forth a block diagram of memory array 40 having a more detailed block diagram of buffer system 44. It will be understood that the descriptions which follow setting forth operation of buffer system 44 are also illustrative of the operations of the remaining buffer systems within memory arrays 21 through 26. Thus, the descriptions which accompany FIG. 3 should be understood to apply equally well to buffer system 45 shown in FIG. 2 as well as the remaining buffer systems within buffers 31 through 36 (seen in FIG. 1).

Buffer system 44 (shown in dashed outline) is coupled to error correction system 43 and includes a bidirectional FIFO buffer 72 coupled to error correction system 43. FIFO buffer 72 is also coupled to a data bus 73. Data bus 73 and its accompanying address bus 74 combine to form communication bus 53. A plurality of memory arrays 50, 51 and 52 (shown in dashed-line) each include respective disk controllers 91, 92 and 93 which are operatively coupled to data bus 73 and address bus 74 in accordance with conventional fabrication techniques. Disk controllers 91, 92 and 93 each include a respective bidirectional FIFO buffer 111, 112 and 113 through which data is transferred to and from data bus 73. Disk controllers 91, 92 and 93 are also coupled to corresponding disk drive arrays 94, 95 and 96 through conventional busses 97, 98 and 99. In the preferred fabrication of the present invention, disk controllers 91, 92 and 93 together with busses 97, 98 and 99 operate in accordance with a system known as small computer system interface, or "SCSI". Thus, controllers 91 through 93 are hereinafter sometimes referred to as SCSI controllers and busses 97, 98 and 99 are hereinafter sometimes referred to as SCSI busses.

A segment buffer 80 having a data input coupled to data bus 73 and an address input coupled to an address increment circuit 81 includes a plurality of memory devices 86 through 89. In their preferred form, memory devices 86 through 89 include relatively inexpensive memory devices of the type referred to in the art as single in-line memory modules, or "SIMMs", containing low-cost DRAM integrated circuit memory devices. The use of such low cost memory devices within segment buffer 80 facilitates the commercial feasibility of providing a segment buffer having sufficient capacity to perform in the manner required by the host system such as the system shown in FIG. 1.

Segment buffer 80 also includes a control logic 79 and an address logic 85 cooperating to organize and operate the plural SIMMs memory devices (memories 86 through 89) as a plurality of ring buffers. The basic organization of memory devices 86 through 89 comprises a row and column matrix which control logic 79 and address logic 85 access. Segment buffer 80 also includes an address incrementor 81 which, as is described below, is utilized in the "fast page" operation of segment buffer 80.

In its preferred form, segment buffer 80 is configured to utilize memory devices 86 through 89 in a plurality of dual-segment ring buffers (one for each channel) configuration DRAM memory (often referred to as a double buffered memory) which operates in a multiported manner. It will be apparent from the discussions which follow that the present invention system may alternatively use other multiple segment ring buffers having three or more segments within the plural data channels. In accordance with the data refresh requirements of the DRAM devices of segment buffer 80, a memory refresh circuit 90 is coupled to segment buffer 80. In addition, a central processing unit interface 82 is also coupled to segment buffer 80.

FIFO buffer 72 is coupled to error correction 43 by a data bus 70 and is also operatively coupled to arbitrator 83. In its preferred form, FIFO 72 is bidirectional. Similarly, it should be recalled that FIFOs 111, 112 and 113 within disk controllers 91, 92 and 93 respectively are also bidirectional.

In operation, and by way of overview, data is transferred between buffer system 44 and error correction system 43 via FIFO buffer 72 and data bus 70. FIFO buffer 72 is managed by arbitrator 83 for controlling data flow in either direction in order to communicate data to and from segment buffer 80 via data bus 73. Data, in the form of short-duration data bursts, is accumulated within segment buffer 80 to form data segments which are transferred to or from disk controllers 91 through 93 via data bus 73. Each disk controller in turn transfers data to or from its associated disk drive group. Central processing unit 75 controls the operation of buffer system 44 and, during play operation, supplies the required addresses to address logic 85 in accordance with the data streams being played. Address logic 85 maintains a sequence list of addresses used to sequentially output data on data bus 73 to maintain the amount of data within FIFO 72 within a predetermined range. During record operation, address logic 85 provides addresses responsive to central processing unit 75 for storing data within segment buffer 80. Arbitrator 83 operates in accordance with the contention resolution priorities set forth below to resolve contentions on bus 53 and to manage data flow to and from segment buffer 80. Also, arbitrator 83 prioritizes requests for access to segment buffer 80 to maintain data flows through FIFO 72 and FIFOs 111, 112 and 113.

More specifically, segment buffer 80 utilizes a plurality of SIMMs memory devices to provide a memory array organized as a plurality of double buffered ring buffers each having sufficient capacity to buffer the high speed data transfer upon data bus 73 between FIFO buffer 72 and FIFO buffers 111, 112 and 113. As mentioned above, segment buffer 80 may alternatively be organized to provide ring buffers which utilize a greater number of ring buffer segments within each channel buffer such as triple or quad ring buffering. Memory devices 86 through 89 are organized in a row and column matrix fast page mode operation such that successive write or read operations utilize a sequence of addresses in a common row. In this manner, the speed of data transferred to and from memory devices 86 through 89 is enhanced. The use of memory devices 86 through 89 organized to provide two segment ring buffers facilitates the above-mentioned simultaneous read and write operations further enhancing the speed of data transferred to and from segment buffer 80.

Because segment buffer 80 is organized in a row and column address matrix, each memory location within memory devices 86 through 89 is defined by a row number and a column number. Fast page mode operation is a system of memory access used in such row and column organized memories in which the column number of an initial address at the start of a read or write process is progressively incremented to access each follow-on address within the same row of addresses. Thus, in the present invention system, address increment circuit 81 begins at a given initial row and column address and thereafter progressively increments the column portion of the initial row and column address to move across the memory array while staying within a single row. The address control logic within segment buffer 80 is flexible and programmable to meet changes in system operation and to accommodate the relatively complex addressing requirements imposed by the use of RAID type error correction.

As mentioned above, each transfer of data to and from the system disk drives takes place in the form of a uniform sized data segment. In its buffering operation, segment buffer 80 accumulates numbers of short duration data bursts within each data channel to form complete data segments for the data channels. Segment buffer 80 is sufficient in capacity to store a plurality of data segments for data channel of each disk drive within each of the disk memory groups controlled by disk controllers 91 through 93. In accordance with an important aspect of the present invention, the large capacity of segment buffer 80 is made cost-effective by the present invention's ability to use low-cost SIMMs devices in a complex environment.

During a record operation in which data is to be stored within disk arrays 94 through 96, data flows into FIFO buffer 72. From FIFO buffer 72, data for each data channel is written to one segment of its ring buffer within segment buffer 80. Simultaneously, data previously written into the other segment of each ring buffer within segment buffer 80 is read from segment buffer 80 and is transferred through disk controllers 91 through 93 to the disk drives which they control. In accordance with the buffering action of segment buffer 80, data is not transferred to the disk controllers until a sufficient amount of data is accumulated to comprise a full segment. Conversely, during a play operation in which data is retrieved from disk arrays 94 through 96, data flows into FIFO buffers 111, 112 and 113. From FIFO buffers 111, 112 and 113 data is written to one segment of each channel's ring buffer within segment buffer 80 while data is simultaneously read from the other segment of the channel's ring buffer within segment buffer 80 and transferred to FIFO 72.

Arbitrator 83 controls the data flow between segment buffer 80 and FIFO buffer 72 and FIFO buffers 111, 112 and 113 within disk controllers 91, 92 and 93 in the manner described below. Each transfer of data to and from segment buffer 80 results from access requests by system elements made to and granted by arbitrator 83 in accordance with the contention resolution priority of the arbitrator set forth below in greater detail. To maintain high speed data flow, each transfer of data to and from segment buffer 80 is carried forward in the form of extremely small data bursts which occur with sufficient speed to approximate continuous data transfer for each system accessing segment buffer 80. Thus, each time disk controllers 91 through 93 require access to segment buffer 80, a request is made to arbitrator 83. Similarly, each time address logic 85 requires access to segment buffer 80 to transfer data to or from FIFO buffer 72, a request is made by address logic 85 to arbitrator 83. Finally, each time refresh logic 86 requests a data refresh cycle for segment buffer 80, arbitrator 83 grants access to segment buffer 80 for refresh logic 86.

As mentioned, arbitrator 83 resolves all contentions for access to segment buffer 80. In performance of this function, arbitrator 83 employs an overall contention resolution priority in which the highest priority is given to data refresh with the next priority given to central processing unit 75 requests. The next priority is given to request by access logic 84 for transfer of data to or from FIFO buffer 72 and the lowest priority is given to disk controllers 91 through 93. With this overall priority established, contention must also be resolved between each of disk controllers 91, 92 and 93 by arbitrator 83. In this resolution, a rotating priority as set forth below in FIG. 4 is utilized.

Arbitrator 83 controls data flow by responding to the amount of data within FIFO 72 and FIFOs 111, 112 and 113. Depending on the direction of data flow (play or record operations), arbitrator 83 will grant access to segment buffer 80 to avoid either overfilling or emptying FIFO 72 or FIFOs 111, 112 and 113. For example, during play operation, data is flowing from disk controllers 91, 92 and 93 to commutator 17 (seen in FIG. 1). Accordingly, arbitrator 83 grants access to segment buffer 80 for data transfer from FIFOs 111, 112 and 113 whenever they are half full or more. Access to segment buffer 80 for data transfer to FIFO 72 is granted whenever FIFO 72 is half full or less. Conversely, during record operation, access to segment buffer 80 for data transfer from FIFO 72 is granted when FIFO 72 is half full or more while access for transfer to FIFOs 111, 112 and 113 is granted when they are half full or less. Thus, by "balancing" data levels in FIFO 72 and FIFOs 111, 112 and 113, arbitrator 83 using segment buffer 80 is able to maintain data flow to and from the memory array which appears continuous.

Figure 4:
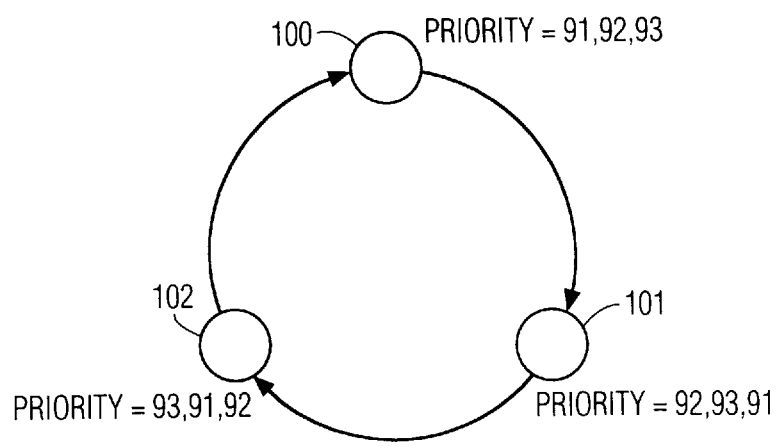
FIG. 4 sets forth an operational diagram illustrative of the rotating priority contention resolution of the present invention data buffering system. (In the several figures, like reference numerals identify like elements.)

FIG. 4 sets forth a diagram of the rotating priority utilized in contention resolution by arbitrator 83 between disk controllers 91 through 93. As is also mentioned above, arbitrator 83 receives all access requests for system elements requiring access to segment buffer 80. As is also mentioned above, the overall priority list for arbitrator 83 establishes the highest priority for data refresh, the next priority for central processing unit 75, the next priority for FIFO buffer 72, and the lowest priority for disk controllers 91 through 93. Thus, contentions between disk controllers 91 through 93 are the only contentions resolved by arbitrator 83 using the rotating priority set forth in FIG. 4. The overall objective of the rotating priority of the present invention system is the desire to avoid an interruption of data flow for any one of the FIFO buffers in disk controllers 91 through 93. In addition, a further objective in establishing the rotating priority of the present invention system is to ensure that minimal time is wasted in making access to segment buffer 80 available to a disk controller which does not require access at the time that access is made available. That is to say, busy disk controllers are not to be forced to wait while idle, or less busy, disk controllers are given access to segment buffer 80. Since this rotating priority is applied solely between contending disk controllers, it does not operate on priority contention between other elements of the system.

With the preceding overview, the details of the rotating priority used by arbitrator 83 are best understood by examining the diagram of FIG. 4. A trio of priority states 100, 101 and 102 are established within arbitrator 83 with arbitrator 83 rotating in a clockwise fashion between each of the three states. It will be understood that the diagram of FIG. 4 and the term rotation are utilized for the purpose of illustrating the sequential operation of arbitrator 83 between the three priority states and to facilitate understanding of the rotating priority system. This sequential operation may be implemented in software or firmware systems.

Assuming initially that arbitrator 83 assumes state 100, the priorities established between disk controllers 91 through 93 place controller 91 highest with controller 92 next and controller 93 at the lowest priority. As a result, with arbitrator 83 in state 100, access is given first to disk controller 91, next to disk controller 92 and thereafter to disk controller 93. Arbitrator 83 remains in priority state 100 until a request for access is presented by a disk controller followed by a grant of access to a requesting disk controller. The granting of an access to a disk controller causes arbitrator 93 to rotate from state 100 to state 101. It should be noted that the rotation of arbitrator 83 occurs solely in response to access having been granted to one of the disk controllers whether or not a contention between requesting controllers occurred or whether or not contention resolution was actually required. Thus, if arbitrator 83 is in state 100 and a request for access is made by any one of disk controllers 91, 92 or 93 and such access is granted, arbitrator 83 rotates to state 101.

At state 101, arbitrator 83 establishes a different priority between disk controllers in which controller 92 now has the highest priority with controller 93 having the next priority and controller 91 being the lowest priority. Once again, arbitrator 83 remains in state 101 until access is requested and granted on behalf of one of the disk controllers. In response to disk controller access being requested and granted, arbitrator 83 rotates to state 102. State 102 is characterized by another priority providing the highest priority to disk controller 93 with the next priority given to disk controller 91 and the lowest priority being given to disk controller 92. In response to the next request and grant of access on behalf of a disk controller, arbitrator 83 again rotates returning to state 100 and reassuming the priorities described for state 100. This rotating priority continues to cycle as successive access requests are granted to the various disk controllers. In this manner, the rotating priority maintains the highest level of uniform activity and data flow on behalf of disk controllers 91 through 93.

What has been shown is a data buffering system for operation in a plural data storage array environment such as a video server in which high speed serial data is communicated to and from the plural disk arrays. The data buffering system utilizes relatively low cost memory devices in a DRAM configuration to provide multiported characteristics. The memory devices are arranged to provide operation in a fast page mode which increases the data speed of the buffering system. Each buffer is configured to provide double buffering within each data channel using a plurality of ring buffers. Enhanced data transfer speed is provided by using simultaneous read and write operations within the data buffer. Data is transferred to and from the data buffer in the form of short duration data bursts which are collected and accumulated within each ring buffer of the data buffer to form larger data segments appropriate in size to be efficiently written to or read from the disk drive memories within the disk arrays. An arbitrator for contention resolution controls access to the data buffer and resolves contentions based upon an overall priority and a rotating subpriority.

While particular embodiments of the invention have been shown and described, it will be obvious to those skilled in the art that changes and modifications may be made without departing from the invention in its broader aspects.

That which is claimed:

1. A system operative within a server having plural input/output devices and plural memory arrays for use in storing and/or retrieving large amounts of data to and/or from said memory arrays to maintain a plurality of substantially continuous data streams, the system comprising:

buffer means for buffering data received in the form of short duration data bursts to form long duration data segments therefrom which are substantially longer than said short duration data bursts, and for buffering data received in said long duration data segments to obtain said short duration data bursts therefrom;

first transfer means for transferring data between said memory arrays and said means for buffering solely in the form of said long duration data segments; and second transfer means for transferring data between said input/output devices and said means for buffering solely in the form of said short duration data bursts.

2. The system as set forth in claim 1, wherein said memory arrays each include an array controller and a plurality of disk memories.

3. The system as set forth in claim 2, wherein each array controller includes a plurality of disk controllers.

4. A system for use in storing and/or retrieving large amounts of data to maintain a plurality of substantially continuous data streams, the system comprising:

a plurality of input/output devices, each having a plurality of input/output data channels;

a plurality of array controllers, each having a plurality of disk controller data channels;

a plurality of buffer memories providing a buffer memory for each of said disk controller data channels for receiving data from said input/output devices in the form of short duration data bursts and accumulating said short duration data bursts to form data segments substantially larger than said data bursts and providing said data segments to said array controllers, and for receiving data from said array controllers in the form of said data segments and providing such data to said input/output devices in the form of said short duration data bursts;

coupling means for coupling data between said input/output devices and said plurality of buffer memories in the form of said short duration data bursts;

a plurality of disk arrays, coupled to said array controllers, each having a plurality of disk memories; and transfer means cooperating with said array controllers to transfer data to and/or from said disk arrays in the form of said data segments.

5. The system as set forth in claim 4, wherein said disk memories exhibit data location time intervals when storing and/or retrieving data, and wherein said data segments are substantially greater in duration than said time intervals.

6. The system as set forth in claim 4, wherein said coupling means includes a commutator which operates in a manner in which it sequentially couples each of said input/output devices to each of said array controllers through said plurality of buffer memories in accordance with a repetitive sequence.

7. The system as set forth in claim 6, wherein said coupling means further includes a plurality of error correction circuits coupled between said commutator and said plurality of buffer memories.

8. The system as set forth in claim 6, wherein said sequence involves each of said input/output devices being individually coupled to each of said array controllers through said plurality of buffer memories at least once during a time period T.

9. A method for use in storing and/or retrieving large amounts of data to maintain a plurality of substantially continuous data streams, the method comprising:

transferring data to and/or from a plurality of input/output data channels in the form of short duration data bursts;

transferring data to and/or from a plurality of disk memories in the form of data segments substantially larger in duration than said short duration data bursts;

segment buffering data transferred from said input/output data channels to said disk memories to accumulate said short duration data bursts into said data segments; and segment buffering data transferred from said disk memories to said input/output channels to form said data segments into said short duration data bursts.

10. The method as set forth in claim 9, further comprising error correcting data transferred to said disk memories from said data channels prior to segment buffering such data, and error correcting data transferred from said disk memories to said input/output channels subsequent to segment buffering such data.

11. The method as set forth in claim 9, wherein said memories exhibit data location time intervals, and said data segments are substantially greater in duration than said time intervals.

* * * * *